(12) United States Patent
Ogawa et al.

(10) Patent No.: US 6,436,321 B1
(45) Date of Patent: Aug. 20, 2002

(54) METHOD OF MANUFACTURING CARPET FOR AUTOMOBILES HAVING A THREE-DIMENSIONAL SHAPE

(75) Inventors: Taro Ogawa; Fumio Goto, both of Kurashiki (JP)

(73) Assignee: Namba Press Works Co., Ltd., Kurashiki (JP)

( * ) Notice: Subject to any disclaimer, the term of this patent is extended or adjusted under 35 U.S.C. 154(b) by 0 days.

(21) Appl. No.: 09/029,792

(22) PCT Filed: Dec. 3, 1996

(86) PCT No.: PCT/JP96/03534

§ 371 (c)(1),
(2), (4) Date: Mar. 9, 1998

(87) PCT Pub. No.: WO98/01286

PCT Pub. Date: Jan. 15, 1998

(30) Foreign Application Priority Data

Jul. 10, 1996 (JP) ............................................. 8-199610

(51) Int. Cl.$^7$ ........................... B29D 9/00; B29C 39/00; B29C 41/08
(52) U.S. Cl. ..................... 264/46.4; 264/45.1; 264/45.2; 264/46.5; 264/46.8; 264/257; 264/309; 156/77; 156/78
(58) Field of Search ..................... 428/95, 195; 156/77, 156/78; 264/45.1, 45.2, 46.4, 46.5, 46.8, 257, 309; 239/128–139

(56) References Cited

U.S. PATENT DOCUMENTS

| | | |
|---|---|---|
| 3,175,936 A | 3/1965 | Squier et al. |
| 3,650,993 A | 3/1972 | Zocco et al. |
| 3,705,834 A | 12/1972 | Terry |
| 3,787,278 A | 1/1974 | Ready et al. |
| 3,849,156 A | 11/1974 | Marlin et al. |
| 4,078,100 A | 3/1978 | Doerfling |
| 4,096,303 A | 6/1978 | Doerfling |
| 4,230,755 A | 10/1980 | Morris |
| 4,579,764 A * | 4/1986 | Peoples, Jr. et al. .......... 428/95 |
| 4,721,641 A * | 1/1988 | Bailey .......................... 428/88 |
| 4,816,494 A | 3/1989 | Watson, Jr. et al. |
| 4,828,898 A * | 5/1989 | Bailey .......................... 428/88 |
| 5,273,698 A | 12/1993 | Thary |

FOREIGN PATENT DOCUMENTS

| | | |
|---|---|---|
| DE | 2007313 | 2/1970 |
| GB | 1380910 | 12/1971 |
| NL | 7703866 | 4/1977 |

OTHER PUBLICATIONS

03042217—Japan (abstract), Feb. 22, 1991.
01288413—Japan (abstract), Nov. 20, 1989.
61227025—Japan (abstract), Oct. 9, 1986.
04133829—Japan (abstract), May 7, 1992.

* cited by examiner

Primary Examiner—Terrel Morris
Assistant Examiner—Ula C. Ruddock
(74) Attorney, Agent, or Firm—Renner, Kenner, Greive, Bobak, Taylor & Weber

(57) ABSTRACT

A method for manufacturing a carpet used for an automobile comprises steps of: coating a preheated liquid foamable mixture directly on a back surface of the surface material by a spray system; placing the surface material in a molding die comprising an upper portion and a lower portion, the upper and lower portions defining a space inside the die corresponding to a three dimensional shape of the carpet; clamping the liquid foamable mixture with the surface material between those portions of the molding die, when the liquid foamable mixture coated on the back surface of the surface material has completed a gas reaction thereof but is still in a visco-elastic flowing condition; and changing the liquid foamable mixture into a solid condition, thereby a foamed body layer made of the liquid foamable mixture is molded in three dimension and is connected with the surface material through the back surface thereof.

11 Claims, 6 Drawing Sheets

Fig.1
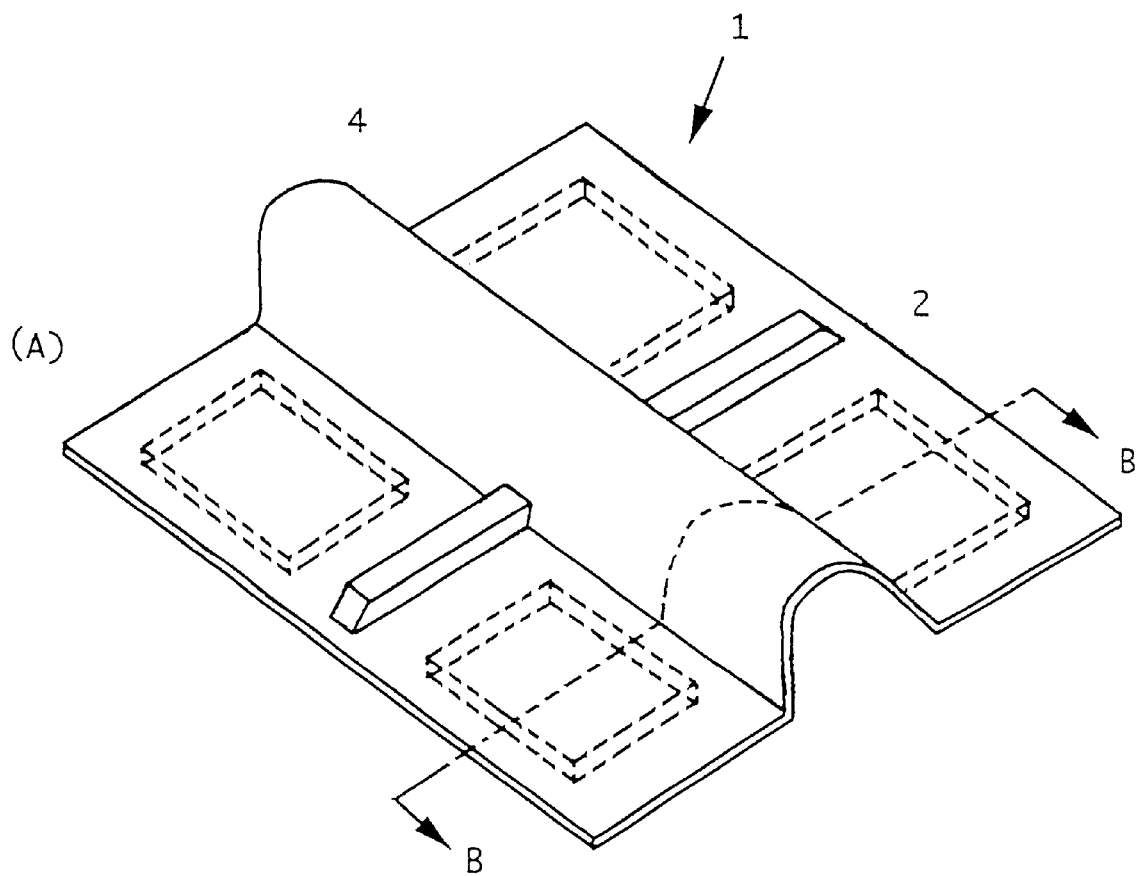
(A)
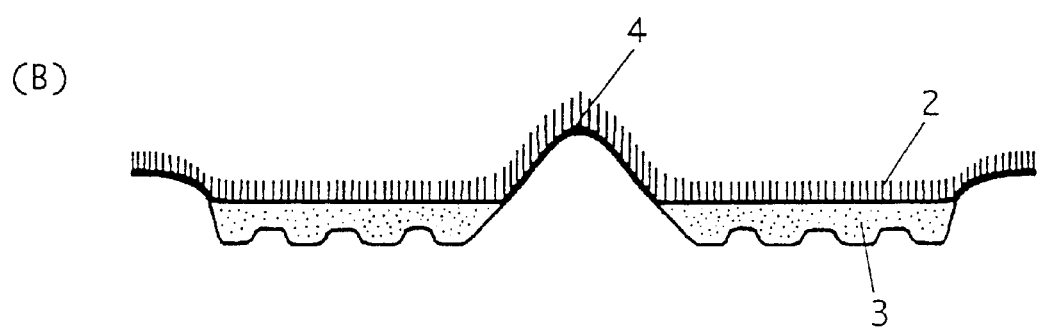
(B)

METHOD OF MANUFACTURING CARPET FOR AUTOMOBILES HAVING A THREE-DIMENSIONAL SHAPE

FIELD OF THE INVENTION

The present invention relates to a three dimensional shaped fiber sheet and, in particular, relates to a three dimensional shaped carpet used for an automobile and a method for manufacturing the carpet.

BACKGROUND OF THE ART

A carpet is used as a mat for an automobile such as a passenger car, a truck, a bus and the like. A carpet base material of such a carpet is classified roughly into a tufted type and a needle punched type.

The tufted type of a carpet base material is manufactured by stitching a base fabric to provide fiber loops (or piles) on a front surface of the base fabric so as to form tufts of the fiber loops thereon, coating a latex on a back surface of the base fabric, and drying the latex not to slip off the fiber loops (hereinafter referred to as "a tufting process").

The needle punched type of a carpet base material is manufactured by cutting synthetic fibers into an appropriate length, layering the fibers with a binder in a constant thickness, needling the layer to form a fiber plate like, and drying the binder. In such a needle punched type of a carpet base material, there is a carpet base material manufactured by layering the fibers with 5–20% wt of additional fibers having a low melting point such as olefin fibers instead of use of the binder, needling the layer to form a fiber plate like, and pressing and heating the layer to bond a part of the fibers not to come loose and slip off the layered fibers. Recently, use of this type of a carpet base material has been increasing.

In order to mold a three dimensional shaped carpet by use of those types of carpet base materials, two processes are required.

A first process thereof includes steps of coating a melt of polyethylene on a back surface of a carpet base material in a constant thickness and leaving the carpet base material at a room temperature for a moment. A second process thereof includes the steps of heating the carpet base material to 120–140° C. in a furnace so as to soften the melt of polyethylene as though the melt is in a half-melting condition and pressing the carpet base material by use of a metallic die having a desired three dimensional shape.

Such two processes are required to mold a three dimensional shaped carpet, and this is because the step of coating the melt of polyethylene should be separated essentially from the step of pressing to mold the carpet.

While a three dimensional shaped carpet can be manufactured by according to such processes, a felt material is, in general, additionally adhered at a necessary part of the carpet in order to achieve a noise absorption.

As described bellow, there are several problems in the manufacture of a three dimensional shaped carpet used for an automobile by use of those types of carpet base materials.

Either type of carpet base materials require those two processes for molding a three dimensional shaped carpet, as described above. Thus, a manufacture of a three dimensional shaped carpet is inefficient. That is, there are many steps to mold a carpet in three dimension, and a large quantity of thermal energy is lost by repeating steps of heating and cooling. In addition, wasteful beginning products must be produced.

In the step of coating the melt of polyethylene on the back surface of the carpet base material, an extrusion coating by use of a T-die is required, and thus, large equipment is required and a large quantity of thermal energy is required when coating the melt.

In use of the tufted type of a carpet base material, two processes for treating a back surface of the carpet base material are required in order not to slip off fiber loops (or piles) provided thereon by a tufting process as described above. One process thereof includes steps of coating a latex on a back surface of the carpet base material (hereinafter referred to as "a back coating"), heating the latex coated on the back surface of the carpet base material and changing the latex into a solid condition, and another process thereof includes a step of coating a melt of polyethylene on the back surface thereof. Assuming that coating the latex on the back surface of the carpet base material is avoided, the cost will be considerably reduced, but when the melt of polyethylene is coated on the back surface thereof without coating the latex, a melt of polyethylene will be percolated on a front surface thereof. Thus, those two processes are indispensable in the art and cause the fibers to lay on the front surface thereof so that the external appearance of the carpet is injured.

There are further problems caused when molding the carpet by use of such types of carpet base materials. The melt of polyethylene coated on the back surface of the carpet base material has a low specific gravity and is uniformly thin so that it is very light weight and is easy to handle, however, it is very inferior in several properties such as noise absorption, damping and thermal insulation.

Thus, in order to use those carpet base materials to manufacture a carpet used for an automobile which requires noise absorption, a damping property and a thermal insulation, in the art, a felt which has a relatively high density is adhered on a necessary part of a back surface of a carpet or, if necessary, vinyl acetate with a large quantity of calcium carbonate is coated over the back surface of the carpet. In addition, in order to achieve a damping property and noise absorption required for a high ranked passenger car, a thin nylon film is attached on the melt of polyethylene coated on the back surface thereof and a foamed body having partially different thickness and resiliency is molded on a surface of the film by molding a rim and the like thereon.

Such additional and several works are not desirable for mass production and increase the manufacturing cost, and thereby it is not practical.

Therefore, an object of the present invention is to provide a three dimensional shaped carpet used for an automobile and a method for manufacturing the carpet in which a thin polyethylene layer having a low specific gravity necessary to mold a carpet is not required.

Another object of the present invention is to provide a three dimensional shaped carpet used for an automobile and a method for manufacturing the carpet in which it is not necessary to carry out a back coating for preventing loosening and slipping off fibers of a surface material of the carpet.

Still another object of the present invention is to provide a three dimensional shaped carpet used for an automobile and a method for manufacturing the carpet in which a back surface of the carpet has a resilient foamed body layer having a partially different hardness.

Yet another object of the present invention is to provide a three dimensional shaped carpet used for an automobile and a method for manufacturing the carpet in which the carpet has a foamed body layer having a partially different thickness.

Yet still another object of the present invention is to provide a method for manufacturing the carpet used for an automobile in which it is not necessary to heat the carpet at a high temperature when molding.

DISCLOSURE OF THE INVENTION

In order to achieve those objects, a three dimensional shaped carpet used for an automobile according to the present invention comprises a surface material and a foamed body layer molded and connected in one with the surface material. On a back surface of the surface material a liquid foamable mixture is directly coated by a spray system, and the surface material is placed in a molding die comprising an upper portion and a lower portion which define a space inside the molding die corresponding to the three dimensional shape of the carpet. The surface material is clamped between the upper and lower portions when the liquid foamable mixture coated thereon has completed a gas reaction thereof but is still in a visco-elastic flowing condition, and thereby the foamed body layer, which is made from the liquid foamable mixture, having the three dimensional shape is molded and connected in one with the surface material.

A method for manufacturing a three dimensional shaped carpet used for an automobile according to the present invention comprises the steps of: coating a liquid foamable mixture directly on a back surface of a surface material of the carpet by a spray system; placing the surface material in a molding die comprising an upper portion and a lower portion having a space defined inside the molding die corresponding to the three dimensional shape of the carpet; clamping the liquid foamable mixture together with the surface material between the upper portion and the lower portion, when the liquid foamable mixture coated on the back surface of the surface material has completed a gas reaction thereof but is still in a visco-elastic flowing condition; and changing the liquid foamable mixture into a solid condition, and thereby a foamed body layer made from the liquid foamable mixture is molded and connected in one with the surface material through the back surface of the surface material.

The liquid foamable mixture is preferably selected from the group consisting of reactive resins such as a polyurethane foam resin and a polyurea foam resin, and it is desirable that the liquid foamable mixture is heated to 60–70° C. and the heated liquid foamable mixture is sprayed.

By partially changing a volume of a space defined inside the molding die, the compressibility of a foamed body molded in the molding die can be partially changed. That is, the compressibility of a part of the foamed body molded in a small volume of the space is high and the compressibility of a part of the foamed body molded in a large volume of the space is low. In order to mold a partially thick foamed body layer, a partially large space is preferably provided in the molding die, and the liquid foamable mixture is coated thickly on a part of a back surface of the surface material corresponding to the large space by a spray system.

The surface material is selected from the group consisting of: a woven fabric and a knitted fabric made of a material selected from the group consisting of a natural fiber, a synthetic fiber, a chemical fiber and an inorganic fiber; a woven fabric formed of piles or fiber loops thereon by a tufting process; a knitted fabric provided with tufts formed of piles or fiber loops thereon by the tufting process; a nonwoven fabric; and a needle punched fabric.

Droplets of the liquid foamable mixture sprayed on the surface material by a spray system enter into a fiber structure of the surface material and are attached on a surface of each fiber of the fiber structure. The liquid foamable mixture attached thereon is immediately foamed by the gas reaction and is expanded, so that the liquid foamable mixture stays at a shallow part inside the surface material and is foamed without impregnating into a deeper part inside the surface material, and thereby the foamed body layer is connected in one with the surface material.

The surface material coated with the liquid foamable mixture is placed in the die comprising the upper and the lower portions and is then pressed between the upper and the lower portions when the liquid foamable mixture coated thereon has completed the gas reaction but is still in a visco-elastic flowing condition. Then, the three dimensional shaped carpet is formed.

The liquid foamable mixture used is a liquid reactive mixture consisting of a large quantity of water, so that the reaction can be accelerated by a heat of reaction of the liquid foamable mixture itself, and thus, it is not necessary to apply heat externally when molding the carpet. Also, moisture generated by the reaction migrates to the fibers of the surface material, and thereby the fiber structure of the surface material can be easily molded.

Moreover, the liquid foamable mixture is a high reactive composition and is heated and sprayed at 60–70° C., so that the liquid foamable mixture is foamed and expanded immediately after attaching on the surface material, so that the viscosity thereof is rapidly increased. Thus, the liquid foamable mixture can be coated in fairly thick selectably at a necessary part of the surface material, and the thickness of the foamed body layer can be partially changed (into a thickness which is difficult in the art) by adjusting the volume of a space defined between the upper and the lower portions of the molding die.

BRIEF DESCRIPTION OF DRAWINGS

FIG. 1(A) is a perspective view of a carpet manufactured by according to the present invention, and FIG. 1(B) is a cross sectional view of the carpet of FIG. 1(A) taken substantially along the line B—B of FIG. 1(A).

DETAILED DESCRIPTION OF THE INVENTION

Figure 2:
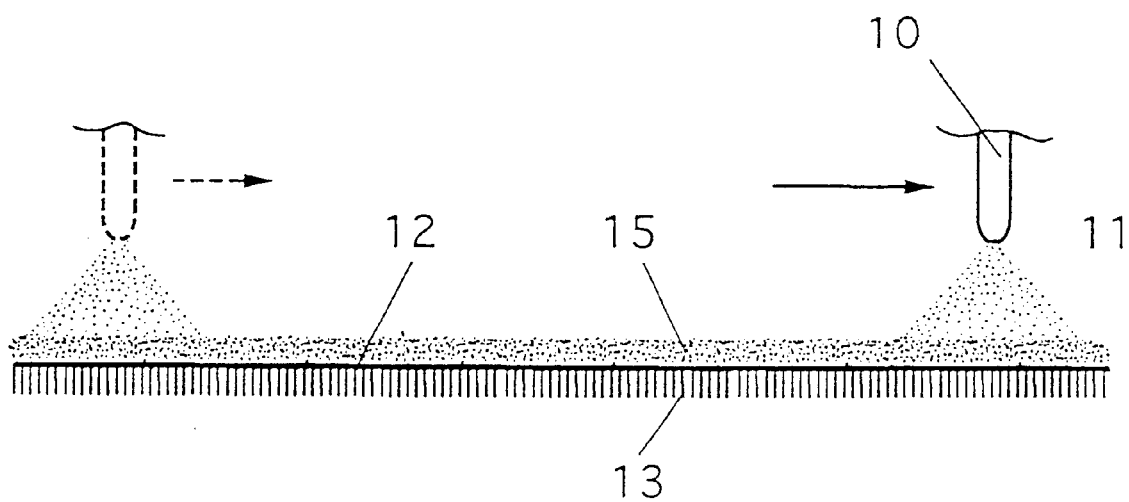
FIG. 2 shows an arrangement when a liquid foamable mixture is coated on a back surface of a surface material by a spray system, in a preferred embodiment according to the present invention.
Figure 3:
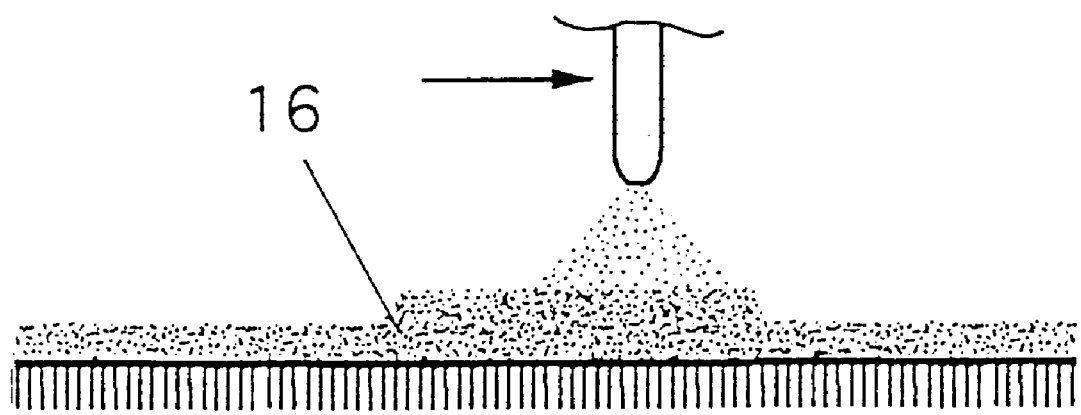
FIG. 3 shows an arrangement when a liquid foamable mixture is partially coated in layers at a predetermined part according to the present invention.

The present invention is described below, with reference to the drawings.

FIG. 1(A) and FIG. 1(B) are perspective and cross sectional views respectively of a preferred embodiment of a three dimensional shaped carpet used for an automobile molded according to the present invention.

A carpet 1 used for an automobile comprises a surface material of the carpet and a foamed body molded and connected in one with the surface material through a back surface of the surface material. The shape of the carpet 1 is typically shown in FIG. 1 and is determined in accordance with a floor shape of an automobile. A base material of the carpet is selected from the group consisting of: a woven fabric and a knitted fabric made of a material selected from the group consisting of a natural fiber, a synthetic fiber, a chemical fiber and an inorganic fiber; a woven fabric provided with tufts formed of piles or fiber loops thereon; a knitted fabric provided with tufts formed of piles or fiber loops thereon; a nonwoven fabric; and a needle punched fabric.

The foamed body may be formed of a reactive resin such as a polyurea foam resin other than a polyurethane foam resin (it should be noted that higher reactive compositions more than those resins can be used and such higher reactive compositions also include in a reactive resin such as a polyurethane foam resin and a polyurea foam resin), and the foamed body is molded and connected in one with the surface material by a method of the present invention described bellow, so that fibers or piles of the tufted type or a needle punched type of carpets can not be lost and slipped off. Thus, it is not required to carry out a back coating only for preventing fibers of piles of the carpet from loosening or slipping off. In addition, the foamed body holds a three dimensional shape of the carpet after the foamed body is molded.

The carpet shown in FIG. 1(A) has tufts of piles (not shown in FIG. 1(A)) formed on a front surface of the carpet 1 as shown in FIG. 1(B). The carpet 1 has a generally flat part 2 and a central curved part 4 extending across a central part of the carpet 1.

A noise absorption part 3 is formed on a back surface of the flat part of the carpet and is formed of a thick, resilient foamed body layer. Such a foamed body layer has a thermal insulation in addition to a noise absorption.

A foamed body layer is also molded on a back surface of the central curved part (a damping part) 4 extending across the central part of the carpet 1. This foamed body layer is thin and is almost in a solid condition. The resiliency thereof is small but this thin foamed body layer holds the central curved part and has a damping property. A side part thereof is also thin and almost in a solid condition.

The foamed body layer as the noise absorption part 3 and the solid like foamed body layer of the central curved part (as the damping part) 4 are formed according to a method of the present invention described bellow. The shape, the thickness and the resiliency thereof are selectively determined.

A method for manufacturing a three dimensional shaped carpet used for an automobile in accordance with the present invention is described with referring to FIGS. 2–6.

Firstly, as shown in FIG. 2, a back surface 12 of a surface material 13 is faced upward. The surface material 13 used in this preferred embodiment has tufts of fiber loops formed on a front surface thereof. A liquid foamable mixture is sprayed and coated on the back surface of the surface material by use of a sprayer 10. An ingredient of the liquid foamable mixture is shown in TABLE 1. This liquid foamable mixture is a high reactive mixture consisting a large quantity of water, and thus, the reaction is accelerated by the heat of reaction of the liquid foamable mixture itself and a moisture generated by the reaction migrates to the fibers so as to contribute to molding the surface material.

TABLE 1

| Ingredient | Weight by Parts |
| --- | --- |
| Polypropyleneglycol[1] | 100 |
| amine catalyzer[a] | 3.5 |
| amine catalyzer[b] | 2.0 |
| amine catalyzer[c] | 0.1 |
| isocyanate[2] | 66.9 |

[1]MITSUI TOATSU KAGAKU (EP-828 ™)
[a]TOSO (L-33 ™)
[b]UCC (NiaxA-1 ™)
[c]AIR PRODUCTS AND CHEMICAL (DABCO T-120 ™)
[2]MITSUI TOATSU KAGAKU (Cosmonate MXC-83 ™)

When coating, this liquid foamable mixture is maintained at a temperature range of 60–70° C., so that the viscosity is low. The spray available for use is PSM3000™ (ISOTHERM Co.) and a spray or mixing head is GP400™ (tip #4 or #3) (ISOTHERM Co.).

In order to coat the liquid foamable mixture of TABLE 1 on the standard surface material as described above in a 1 mm average thickness, the liquid foamable mixture is coated for about 24 seconds (by use of a single spray mixing head).

Thus, an amount of the liquid foamable mixture coated thereon is preferably in the range of about 0.32–5.2 kg/m$^2$, more preferably in the 1.0–3.5 kg/M$^2$.

Figure 6:
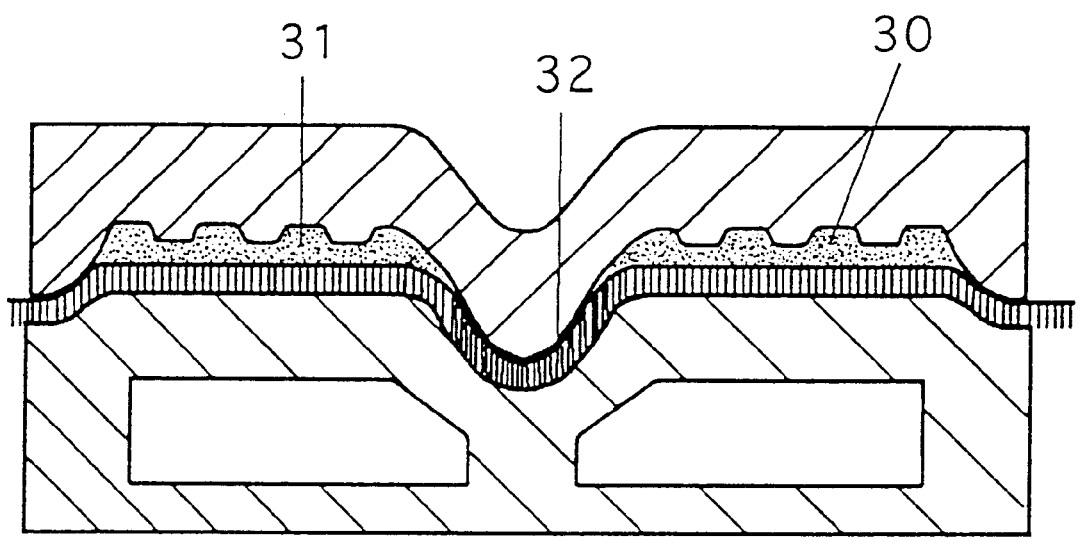
FIG. 6 shows an arrangement when a carpet coated with a liquid foamable mixture thereon is clamped by a molding die, according to the present invention.

In order to mold the noise absorbing part 3 formed by a thick part of the foamed body as shown in FIG. 1, spaces 30, 31 corresponding to the noise absorbing parts 3, respectively, are provided so as to define larger spaces between an upper portion and a lower portion of the molding die shown in FIG. 6, and the liquid foamable mixture is coated thickly on a part (indicated by reference numeral 16 in FIG. 3) corresponding to each larger space. As seen, the liquid foamable mixture may be coated thickly over the back surface of the surface material. However, this is not desirable, because when the liquid foamable mixture is coated thickly over the back surface thereof, the liquid foamable mixture will be excessively pressed at a part corresponding to a small space defined between the upper and the lower portions of the molding die, and thus, this part of the resulting foamed body is needlessly hardened, that is, the liquid foamable mixture is used wastefully.

Figure 4:
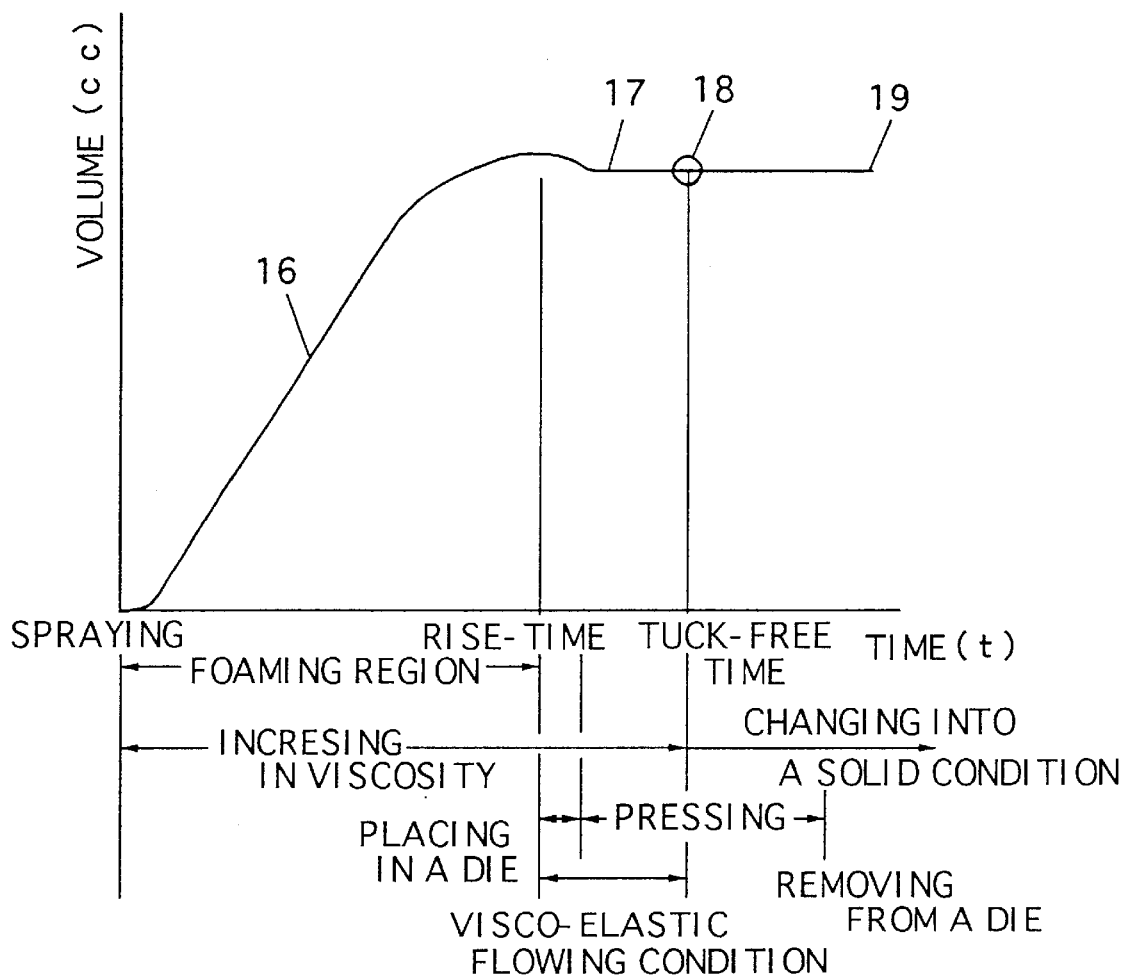
FIG. 4 is a graph showing processes of foaming and curing a liquid foamable mixture used for the present invention.

The liquid foamable mixture used herein varies in the condition thereof during a chemical reaction thereof, as shown in FIG. 4. As shown by a line 16 in FIG. 4, the mixture is chemically reacted immediately after the mixture is sprayed, so as to emit $CO_2$ rapidly while the mixture is foamed to rapidly expand the volume thereof (a foaming region). After such a gas reaction is completed (at a rise-time), the mixture is in a visco-elastic flowing condition for the duration corresponding to a line 17. In this condition, when the mixture is pressed, the mixture can be deformed easily. The mixture starts to change its condition into a solid condition at a point 18 called as a tuck-free and is then completely changed into a solid condition (at 19), and as a result, a foamed body layer is formed.

The liquid foamable mixture, which can change the condition thereof as described above, is heated as described so that the reaction thereof can be accelerated and the viscosity can be lowered. When the heated liquid foamable mixture is sprayed by the sprayer, uniform and fine droplets 11 (FIG. 2) of the mixture, which can not be achieved by a liquid foamable mixture used in the art, are sprayed on the surface material and are entered into a fiber structure thereof while the droplets are chemically changing rapidly (the mixture is pre-heated, and thus, the droplets of the mixture is chemically changed rapidly even though temperature of the droplet is decreased when spraying), so as to attach the droplets on a surface of each fiber of the fiber structure. The droplets attached thereon immediately expand in volume and increase the viscosity thereof, and as a result, the droplets can be entered everywhere in a superficial part of the surface material without entering into a deeper part of the surface material.

When the mixture is coated by spraying as described above, the mixture is in one with the superficial part of the surface material about the back surface thereof without the mixture percolating to the fiber structure about the front surface of the carpet. Then, the mixture is changed into a solid condition, and thereby the fiber material of the carpet can be rigidly held not to loosen and slip off the fibers (as described herein, a shallow part of the surface material is defined by a part in which the mixture is entered so as not to loosen and slip off the fibers of the carpet without the mixture being percolated to a front surface of the surface material).

Figure 5:
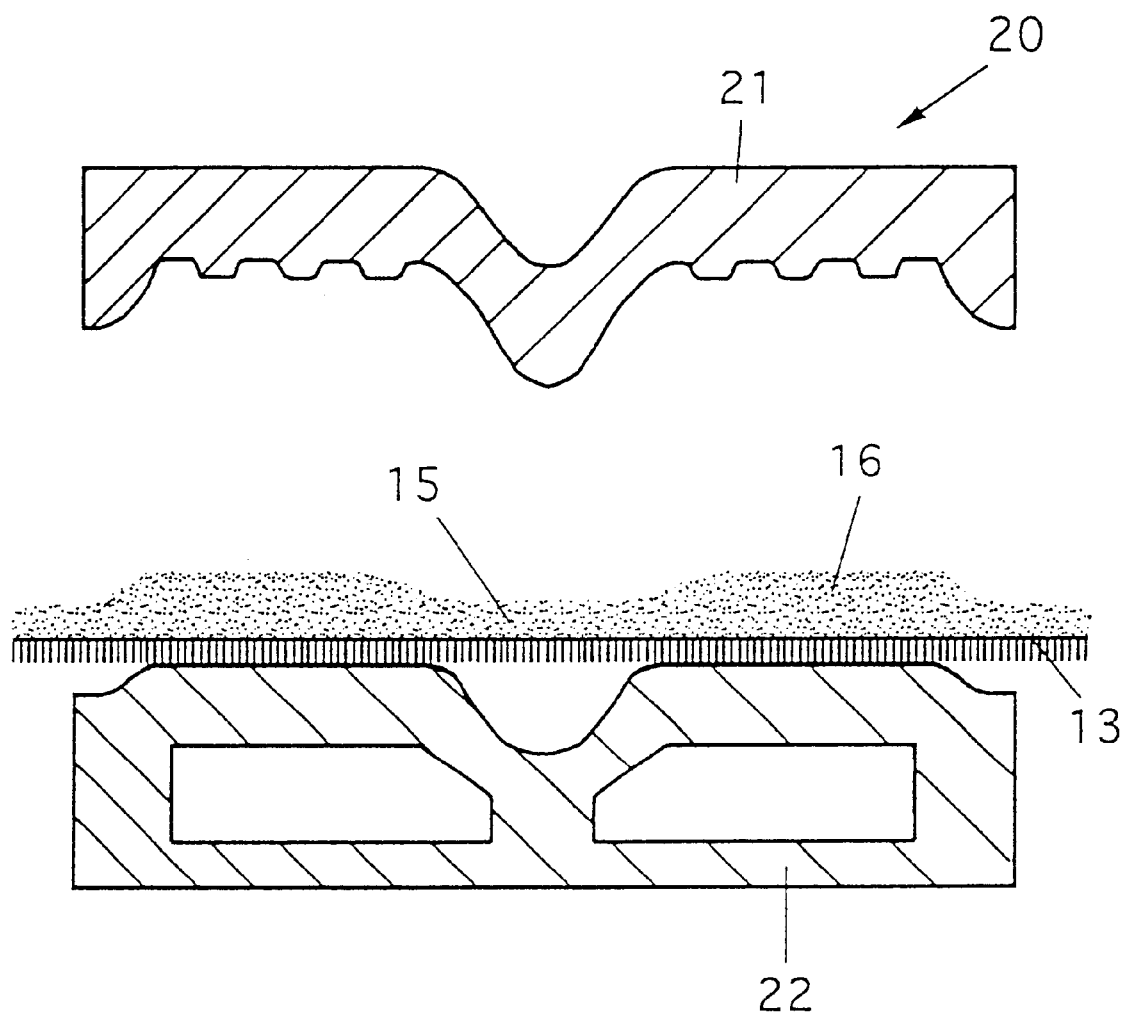
FIG. 5 shows an arrangement just before a carpet coated with a liquid foamable mixture thereon is clamped by a molding die, according to the present invention.

The liquid foamable mixture in a visco-elastic flowing condition can be easily deformed (with referring to FIG. 4). The surface material 13 coated with the liquid foamable mixture 15 is placed between an upper portion 21 and a lower portion 22 of a molding die 20, as shown in FIG. 5, and is then pressed and clamped between those portions of the molding die when the liquid foamable mixture 15 is in the visco-elastic flowing condition (FIG. 6). The surface material coated with the liquid foamable mixture used in the preferred embodiment is pressed and clamped after the elapse of about 50–70 seconds after the mixture is sprayed. Thus, the liquid foamable mixture is pressed and deformed along the die.

The upper portion 21 and the lower portion 22 of the molding die 20 are designed so as to form a space corresponding to a desired shape of a carpet between those portions when those portions are closed (with referring to FIG. 6). That is, as shown in FIG. 1, an inner shape of the molding die is designed such that the space (indicated by reference numerals 30, 31) formed between those portions of the die corresponding to the noise absorbing part 3 is larger and the space (indicated by reference numeral 32) formed between those portions corresponding to the central curved part 4 is smaller. A part of a resulting foamed body pressed in the smaller space is harder, and in contrast, a part of the resulting foamed body pressed in the larger space is softer and resilient.

The surface material is clamped for a predetermined period (about 60 seconds in this embodiment) (FIG. 6). The pressure applied to the surface material by the molding die is released after more than 90% of the mixture is changed into a solid condition, and a carpet which keeps its shape stably is removed from the molding die.

Alternatively, the arrangement of the upper and the lower portions of the die may be reversed. It should be noted that in this arrangement the back surface of the surface material sprayed with the mixture should be placed so as to contact with an inner surface of the die having a shape corresponding to a specified floor.

Accordingly, the carpet having a three dimensional shape corresponding to the space inside the die is manufactured in shape. As described, the foamed body layer is entered into the surface material and formed and connected in one with the surface material, so that the shape of the carpet can be held. Also, the foamed body layer serves to hold fibers of the surface material so as not to loosen and slip off the fibers. Thus, a back coating on a back surface of a surface material, which is essentially carried out in the art, is not required.

The thickness of the foamed body layer formed of the liquid foamable mixture can be controlled (or be partially controlled) by adjusting the space inside the die and the thickness of the liquid foamable mixture coated on the surface material, and thus, 10–50 mm thick of the foamed body layer, which is difficult to form in the art, can be formed. That is, a part of the foamed body is suitably formed thickly (or thinly) by adjusting the volume of a space inside the die corresponding to the part so as to make the volume large (or small) and coating thickly (or thinly) the liquid foamable mixture on a part of the surface material corresponding to the part of the foamed body layer. Similarly, the resiliency of the foamed body layer can be controlled.

In addition, while a practical processing time such as a spraying time, a press time and the like is exhibited in the above embodiment, this processing time should be suitably modified dependent on the mixture used being a composition which reacts rapidly and the temperature of the die.

A foamed body layer formed and connected in one with a surface material of a carpet in accordance with the present invention is formed by coating a liquid foamable mixture by use of a spray and then pressing by use of a die. That is, it is achieved by the present invention to eliminate two processes for a back surface of the surface material which are carried out by externally applying a large quantity of thermal energy to a carpet in accordance with the art. Thus, problems are caused by those two processes in that fibers of the carpet are laid on the surface material and the external appearance of the carpet is injured, however, a high quality carpet having no such problems can be manufactured according to the present invention.

When the liquid foamable mixture is sprayed in accordance with the present invention, droplets thereof are entered into a fiber structure of the surface material of the carpet, so that the foamed body layer formed of the sprayed liquid foamable mixture is connected in one with the surface material not to loosen or slip off fibers of the carpet. Thus, a back coating required in the art is eliminated in the present invention. In addition, the sprayed liquid foamable mixture is stayed in a superficial part about the back surface of the surface material not to percolate the mixture to the front surface thereof and not to harden all fibers of the carpet, and thus, a carpet having a good tactual feeling can be manufactured.

In the present invention, a quantity of the liquid foamable mixture coated on the surface material can be partially changed. That is, by a combination of partially changing the quantity of the mixture and partially changing a volume of a space defined in the die, a carpet having a foamed body layer molded in one with a back surface thereof which has a desired thickness and a desired hardness (relating to the resiliency) at a desired part of the foamed body layer can be manufactured. Thus, in order to provide a damping property, a noise absorption and a thermal insulation, additional materials are required in the art, however, a carpet having a good damping property, a good noise absorption and a good thermal insulation can be manufactured by suitably forming the foamed body layer in accordance with the present invention.

We claim:

1. A method for manufacturing a three dimensional shaped carpet used for an automobile, comprising steps of providing a preheated liquid foamable mixture:

coating a preheated liquid foamable mixture directly on a back surface of a surface material of said carpet by a spray system;

placing said surface material in a molding die comprising an upper portion and a lower portion, said upper and said lower portions defining a space inside said molding die corresponding to a three dimensional shape of said carpet;

pressing and clamping) said liquid foamable mixture with said surface material between said upper portion and said lower portion, when said liquid foamable mixture coated on said back surface of said surface material has completed a gas reaction thereof but is still in a visco-elastic flowing condition; and changing said liquid foamable mixture into a solid condition, thereby a foamed body layer made of said liquid foamable mixture is molded in three dimension and is molded and connected in one with said surface material through said back surface thereof, wherein droplets of said liquid foamable mixture coated on said surface material by said spray system are entered into a fiber structure of said surface material and are attached on a surface of each fiber of said fiber structure while said liquid foamable mixture attached on said fiber of said fiber structure is immediately foamed and expanded by said gas reaction, so that said liquid foamable mixture remains at a shallow part inside of said surface material and is foamed without said liquid foamable mixture being impregnated into a deeper part thereof, and thereby said foamed body layer is in one with said carpet.

2. The method of claim 1, wherein said liquid foamable mixture is a polyurethane foam resin or a polyurea foam resin.

3. The method of claim 2, wherein said liquid foamable mixture is heated to 60–70° C. and is then sprayed.

4. The method of claim 1, wherein by partially changing a volume of a space defined in said molding die, the compressibility of a part of a foamed body molded by a small volume of said space of a part of said molding die is high and the compressibility of a part of said foamed body molded by a large volume of said space of a part of said molding die is low.

5. The method of claim 1, wherein said step of coating includes a step of coating said liquid foamable mixture thickly on a part of said back surface of said surface material relative to a thickness of said liquid foamable mixture coated on another part of said back surface thereof by spraying said liquid foamable mixture thereon, said part corresponding to a large volume of said space partially defined in said molding die.

6. The method of claim 1, wherein said surface material being selected from the group consisting of: a woven fabric or a knitted fabric, either of which is made of a material selected from the group consisting of a natural fiber, a synthetic fiber, a chemical fiber and an inorganic fiber; a woven fabric having tufts formed of piles or fiber loops thereon; a knitted fabric having tufts formed of piles or fiber loops thereon; a nonwoven fabric; and an needle punched fabric.

7. A method for manufacturing a three dimensional shaped carpet for an automobile, comprising the steps of:

providing a surface material having a fiber structure with a back surface thereof providing a preheated liquid foamable mixture;

selectively applying a preheated liquid foamable mixture directly on said back surface of said surface material of the carpet with a spray system so that droplets of the liquid foamable mixture enter into said fiber structure of said surface material and are attached on the surface of said fiber structure as the liquid foamable mixture immediately foams and expands by gas reaction, so that said liquid foamable mixture makes only shallow penetration of said surface material without percolation through said surface material;

placing said surface material with said liquid foamable mixture coated thereon by foaming reaction in a molding die having an upper portion and a lower portion defining a space inside said molding die corresponding to the three dimensional shape of the carpet;

pressing and clamping said surface material and said liquid foamable mixture between said upper portion and said lower portion of said molding die when said liquid foamable material has completed said gas reaction but is still in a visco-elastic flowing condition to deform the foamed liquid foamable mixture to the shape of said molding die; and maintaining the pressing and clamping of said foamed liquid foamable mixture and said surface material until said foamed liquid foamable mixture is in substantially a solid condition integral with said surface material to provide a stable, three dimensional shaped carpet.

8. The method of claim 7, including the step of:

delaying the pressing and clamping step until approximately 50 to 70 seconds after the applying of said liquid foamable mixture on said surface material.

9. The method of claim 7, including the step of:

providing a liquid foamable mixture that is a highly reactive mixture, whereby the reaction of the liquid foamable mixture is accelerated by the heat of gas reaction.

10. The method of claim 7, including the step of providing a liquid foamable mixture that includes a large quantity of water, whereby the moisture generated by the gas reaction migrates to said surface material to contribute to molding of said surface material.

11. The method of claim 7, wherein said step of applying a preheated liquid foamable mixture on said back surface of said surface material includes the step of coating said liquid foamable mixture in differing thicknesses in different parts of said back surface of said surface material.

* * * * *